United States Patent [19]

Mitchell et al.

[11] 3,900,451

[45] Aug. 19, 1975

[54] METHOD OF MAKING SULFHYDRYL-CONTAINING POLYMERS

[75] Inventors: Albertha B. Mitchell, Framingham; Suzanne V. McKinley, Wellesley, both of Mass.; Joseph W. Rakshys, Jr., Midland, Mich.

[73] Assignee: The Dow Chemical Company, Midland, Mich.

[22] Filed: Aug. 24, 1973

[21] Appl. No.: 391,429

[52] U.S. Cl. .......................... 260/79.5 NV; 260/778
[51] Int. Cl. ............................................ C08f 27/06
[58] Field of Search .................... 260/79.5 NV, 778

[56] References Cited
UNITED STATES PATENTS

| | | | |
|---|---|---|---|
| 2,137,584 | 11/1938 | Ott | 260/778 |
| 2,563,640 | 8/1951 | Brown | 260/778 |
| 2,563,662 | 8/1951 | Rothrock | 260/778 |
| 3,696,083 | 10/1972 | Hwa | 260/79.5 C |
| 3,696,084 | 10/1972 | Gordon | 260/79.3 R |

FOREIGN PATENTS OR APPLICATIONS 1,227,144   4/1971   United Kingdom................. 252/438

OTHER PUBLICATIONS

Chemical Abstracts, Vol. 53, No. 6, Mar. 25, 1959, page 5730d.

Reid, Organic Chemistry of Bivalent Sulfur, Vol. 1, 1958, Chemical Publishing Co. Inc., N.Y., N.Y., pages 25, 26 & 381.

Primary Examiner—Ronald W. Griffin
Attorney, Agent, or Firm—L. Wayne White

[57] ABSTRACT

A novel process is disclosed for making a functional polymer whose backbone comprises units of the formula

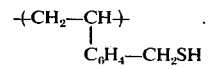

In this process, a chloromethylated vinylaromatic polymer (e.g. chloromethylated polystyrene) is reacted with an alkali metal hydrosulfide in the presence of a catalytic amount of an organic quaternary onium compound (e.g. tetrabutylammonium bisulfate).

6 Claims, No Drawings

METHOD OF MAKING SULFHYDRYL-CONTAINING POLYMERS

BACKGROUND OF THE INVENTION

This invention pertains to a new process for making sulfhydryl-containing polymers whose backbones comprise units of the formula

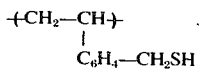

Such polymers are known in the art and have been used, for example, as catalysts in various reactions and in complexing metal ions, such as copper and mercury. Previous methods of preparing such sulfhydryl-containing polymers included the technique described by Okawara et al. (Chemical Abstracts 53: 5730d) wherein chloromethylated polystyrene was first reacted with thiourea and the intermediate thus formed was subsequently hydrolyzed with caustic to form the desired polymers.

SUMMARY OF THE INVENTION

A novel process for preparing sulfhydryl-containing polymers has now been discovered. The new process comprises reacting by contacting (a) a chloromethylated vinylaromatic polymer with (b) an alkali metal hydrosulfide in the presence of (c) a catalytic amount of an organic quaternary onium compound. The novel process is schematically represented below:

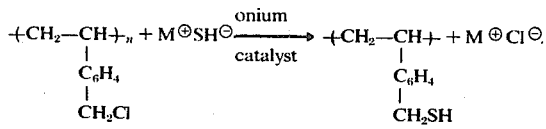

The results of this process were surprising both in the high rate of reaction and the high degree of nucleophilic displacement.

In practice, the chloromethylated vinylaromatic polymers are swollen or dissolved in an inert water-immiscible organic solvent (e.g. benzene, toluene, 2,4-dichlorobenzene, etc.) to form an organic phase. An aqueous phase is then formed by dissolving the alkali metal hydrosulfide in water. The two phases are combined in a suitable vessel and the quaternary onium catalyst(s) added to the reaction mixture. After a suitable reaction period, the organic phase containing the sulfhydryl-containing polymer is separated from the reaction mixture and the product recovered therefrom by flashing off the solvent or by other conventional means.

The reaction temperature may be varied to convenience but satisfactory reaction rates have been observed at temperatures of from about 20° to about 80°C (preferably 40°–60°C). The reaction rate is also increased by efficient blending (e.g. stirring) of the reaction mixture.

The reactants involved in the instant process are known classes of compounds.

The known class of alkali metal hydrosulfides includes lithium, sodium, potassium, rubidium and cesium hydrosulfide. Sodium and/or potassium hydrosulfide are normally used, based on their relative cost and commercial availability.

The chloromethylated vinylaromatic polymers are likewise well known. The polymer backbone of such polymers comprises units of the formula

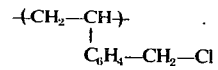

Normally the polymers bear an average of one chloromethyl group per aromatic ring and it is in the meta and/or para ring position. The polymers are prepared by homopolymerizing ar-vinylbenzyl chloride (VBC) or by interpolymerizing VBC with other suitable vinyl monomers. Alternatively, the chloromethylated vinylaromatic polymers can be prepared by chloromethylating polystyrene or interpolymers of styrene with, for example, chloromethyl methyl ether. The polymerization techniques for VBC and the chloromethylation of polyvinylaromatics with chloromethyl methyl ether are, of course, well known. See, for example, Hoffenberg (U.S. Pat. No. 2,981,758) who describes chloromethylation with chloromethyl methyl ether and see Jones et al. C.A. 55: 17078i and C.A. 56: 10373d, Lloyd et al. C.A. 58: 8051h, Askarov et al. C.A. 76: 113565a and C.A. 77: 140572, McMaster (U.S. Pat. Nos. 2,992,544 and 3,022,253), Clarke et al. (U.S. Pat. No. 2,780,604), and Rassweiler et al. (U.S. Pat. No. 3,068,213) who describe some of the polymers of VBC. Examples of suitable such polymers therefore include chloromethylated polystyrene, poly(VBC), styrene-VBC interpolymers, acrylonitrile-VBC interpolymers, and the like. The polymers can be linear or lightly cross-linked (e.g. up to about 5 percent with divinylbenzene).

The stoichiometry of the reaction requires one mole of alkali metal hydrosulfide per chloromethyl equivalent in the polymer. A slight excess of alkali metal hydrosulfide is normally used, however.

The catalysts here used are organic onium salts of the elements of group 5(a) and 6(a) of the Periodic Chart and are known in the art as phase-transfer catalysts. Suitable such salts are therefore ammonium salts, phosphonium salts, sulfonium salts, etc. as described, for example, by Starks and Napier in British Patent Specification No. 1,227,144 and by Starks in J. Am. Chem. Soc. 93, 195 (1971). Preferred onium salts have from about 10 to about 30 carbon atoms. Additionally, the ammonium salts are currently preferred over the other onium salts and benzyltrimethyl-, benzyltriethyl- and tetra-n-butylammonium salts are most preferred. Suitable onium salts have a minimum solubility of at least about 1 weight percent in both the organic phase and the aqueous phase at 25°C. To further illustrate the type onium salts which can be used, suitable ammonium salts are represented by the formula $R_1R_2R_3R_4N^+A^-$, wherein $R_1$–$R_4$ are hydrocarbyl groups (e.g. alkyl, aryl, alkaryl, aralkyl, cycloalkyl, etc.) and $R_1$ can join with $R_2$ to form a 5- and 6-membered heterocyclic compound having at least one quaternized nitrogen atom in the ring and may also contain one atom of nitrogen, oxygen or sulfur within the ring. Typically, $R_1$–$R_4$ are hydrocarbyl groups of from 1 to about 16 carbon atoms. Similar formulas can be drawn for the phosphonium and sulfonium salts and the like. The neutralizing anion portion of the salt (e.g. $A^-$) may be varied to convenience. Chloride, bromide and bisulfate are preferred anions, but other representative anions include nitrate, tosylate, acetate, etc. The following compounds are illustrative: tetraalkyl ammonium salts, such as tetramethyl-, tetraethyl-, tetra-n-butyl-, tetrahexyl-, methyltriethyl-, and trioctylmethyl-, hexadecyltriethyl- and tridecylmethylammonium chlorides, bromides, bisulfates, tosylates, etc.; aralkylammonium salts, such as tetrabenzylammonium chloride, benzyltrimethyl-, benzyltriethyl-, benzyltributyl- and phenethyltrimethylammonium chlorides, bromides, iodides, etc.; arylammonium salts, such as triphenylmethylammonium fluoride, chloride or bromide, N,N,N-trimethylanilinium chloride, N,N,N-triethylanilinium bromide, N,N-diethyl-N-ethylanilinium bisulfate, trimethylnaphthylammonium chloride, p-methylphenyltrimethylammonium chloride or tosylate, etc.; 5- and 6-membered heterocyclic compounds containing at least one quaternized nitrogen atom in the ring, such as N,N,N', N'-tetramethylpiperaziniumdichloride, N-methylpyridinium chloride, N-hexylpyridinium iodide, 4-pyridyltrimethylammonium iodide, 1-methyl-1-azoniabicyclo[2.2.1]heptane bromide, N,N-dibutylmorpholinium chloride, N-ethylthiazolinium chloride, N-butylpyrrolium chloride, etc., and the corresponding phosphonium and sulfonium salts, and the like. The onium catalysts are included in the reaction mixture in small but sufficient amounts to catalyze the reaction between (a) and (b) above. E.g. from about 0.01 to about 10 mole percent. In most instances, however, amounts of from about 0.2 to about 3 mole percent are preferred. The following example further illustrates the invention.

EXAMPLE 1

Resin beads of a lightly cross-linked styrene-VBC interpolymer (10 g.; 0.021 mole of VBC) were swollen in o-dichlorobenzene. To this was added a concentrated aqueous solution of sodium hydrosulfide (0.153 mole) and tetra-n-butylammonium bisulfate (0.003 mole). The mixture was stirred at 100°C for 24 hours and cooled to room temperature. The resin beads thus treated were filtered from the mixture, washed with methylene chloride and dried in a vacuum oven at 60°C and 0.1 mm/Hg for 48 hours. Elemental analysis for sulfur in the polymer showed the conversion of

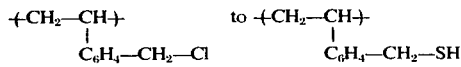

to be greater than 95% complete.

Other polymers and catalysts as described above can be similarly used.

We claim:
1. A process for preparing sulfhydryl-containing polymers comprising reacting by contacting
   a. a chloromethylated vinylaromatic polymer whose backbone comprises units of the formula

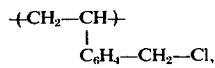

said polymer being swollen or dissolved in an inert water-immiscible organic solvent, and
   b. an aqueous solution of an alkali metal hydrosulfide, in the presence of
   c. a catalytic amount of an organic onium salt.
2. The process defined by claim 1 wherein (c) has a total carbon content of from about 10 to about 30 carbon atoms.
3. The process defined by claim 1 wherein (c) is quaternary ammonium salt.
4. The process defined by claim 3 wherein (c) is benzyltrimethyl-, benzyltriethyl- or tetra-n-butylammonium salts.
5. The process defined by claim 1 wherein (b) is an aqueous solution of sodium or potassium hydrosulfide.
6. The process defined by claim 4 wherein (b) is an aqueous solution of sodium hydrosulfide.

* * * * *